(12) United States Patent
Cresswell et al.

(10) Patent No.: US 10,609,852 B2
(45) Date of Patent: Apr. 7, 2020

(54) METHOD AND APPARATUS FOR SEED BED PREPARATION

(71) Applicant: Bourgault Industries Ltd., St. Brieux (CA)

(72) Inventors: Mark Cresswell, St. Brieux (CA); Devin Lung, St. Brieux (CA); Kyle Bayne, St. Brieux (CA); Trevor Kondratowicz, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 155 days.

(21) Appl. No.: 15/801,361

(22) Filed: Nov. 2, 2017

(65) Prior Publication Data

US 2018/0228072 A1    Aug. 16, 2018

(30) Foreign Application Priority Data

Feb. 14, 2017   (CA) .................................... 2957971

(51) Int. Cl.
    *A01B 49/02*    (2006.01)
    *A01B 5/04*     (2006.01)
    (Continued)

(52) U.S. Cl.
    CPC .............. *A01B 5/04* (2013.01); *A01B 21/086* (2013.01); *A01B 23/00* (2013.01); *A01B 49/02* (2013.01); *A01B 61/046* (2013.01)

(58) Field of Classification Search
    CPC .......... A01B 35/18; A01B 49/02; A01B 63/16
    (Continued)

(56) References Cited

U.S. PATENT DOCUMENTS

| 6,554,078 B1 * | 4/2003 | McDonald | ............. A01B 25/00 |
| | | | 172/146 |
| 6,612,381 B2 * | 9/2003 | Powell | ................ A01B 23/046 |
| | | | 172/145 |

(Continued)

FOREIGN PATENT DOCUMENTS

| CA | 2940713 A1 | 3/2017 |
| GB | 1078133 A | 8/1967 |

OTHER PUBLICATIONS

Australian Office Action dated Jan. 11, 2019 for Application No. 2017248459, 9 pages.

(Continued)

*Primary Examiner* — Gary S Hartmann
(74) *Attorney, Agent, or Firm* — Frost Brown Todd LLC; Nicole M. Tepe (57) ABSTRACT

An implement for preparing a seed bed has a front row of vertical discs, followed by three rows of shanks, followed by harrows and then rolling baskets. A hydraulic cylinder is mounted between each shank and the implement frame and exerts a constant selected trip bias force on the shanks that is adjustable up to 1300 pounds. The implement frame is configured such that a total weight on the wheels when the ground engaging tools are in the raised transport position is greater than about 850 pounds per foot of width of the implement frame. The implement is towed at speeds of at least seven miles per hour with the shanks penetrating the soil to a depth of three inches or more. Residue is cut and buried and the field surface left firm and smooth.

11 Claims, 6 Drawing Sheets

(51) Int. Cl.
*A01B 21/08* (2006.01)
*A01B 61/04* (2006.01)
*A01B 23/00* (2006.01)

(58) Field of Classification Search
USPC ....... 172/140, 144, 145, 146, 149, 175, 176, 172/178, 468, 471, 613
See application file for complete search history.

(56) References Cited

U.S. PATENT DOCUMENTS

| | | | | |
|---|---|---|---|---|
| 6,896,068 | B2* | 5/2005 | Dietrich, Sr. | A01B 49/027 172/142 |
| 7,000,708 | B2* | 2/2006 | Powell | A01B 23/046 172/600 |
| 7,108,075 | B2* | 9/2006 | Powell | A01B 23/046 172/1 |
| 7,159,523 | B2* | 1/2007 | Bourgault | A01C 7/06 111/187 |
| 8,020,629 | B1* | 9/2011 | McFarlane | A01B 21/08 172/145 |
| 8,047,299 | B2* | 11/2011 | Hurtis | A01B 63/32 172/140 |
| 8,657,023 | B2* | 2/2014 | Casper | A01B 63/111 172/145 |
| 9,648,798 | B2* | 5/2017 | Sudbrink | A01B 63/14 |
| 9,872,422 | B2* | 1/2018 | Sudbrink | A01B 63/14 |
| 2003/0127235 | A1* | 7/2003 | Dannigkeit | A01B 63/22 172/2 |
| 2003/0196823 | A1* | 10/2003 | McDonald | A01B 25/00 172/146 |
| 2004/0016554 | A1* | 1/2004 | McDonald | A01B 25/00 172/146 |
| 2011/0220373 | A1* | 9/2011 | Martindale | A01B 41/04 172/21 |
| 2013/0199807 | A1* | 8/2013 | Hoffman | A01B 49/027 172/1 |
| 2014/0374128 | A1 | 12/2014 | Gray et al. | |

OTHER PUBLICATIONS

Australian Office Action dated Mar. 7, 2019 for Application No. 2017248459, 5 pages.
Great Plains "Disc-O-Vator" Product Information, 2015, downloaded from http://www.greatplainsag.com/en/products/714/disc-o-vator%C2%AE, 11 pgs.
John Deere "2310 Mulch Finisher" Brochure, 2012, downloaded from https://www.deere.com/en_ASIA/docs/brochure/product/equipment/tillage/seedbed_tillage/zmag/seedbed_tillage2012.html, 6 pgs.
Canadian Office Action dated Mar. 27, 2018 for Application No. CA 2,957,971, 10 pgs.

* cited by examiner

METHOD AND APPARATUS FOR SEED BED PREPARATION

CROSS-REFERENCE TO RELATED APPLICATION

This application claims priority to and benefit of CA Serial No. 2,957,971, filed Feb. 14, 2017, the contents of which are incorporated by reference in their entirety for all purposes.

FIELD OF THE INVENTION

This disclosure relates to the field of agricultural implements and in particular a tillage apparatus for preparing a seed bed in field conditions with high levels of crop residue on the field surface.

BACKGROUND

Farm operators have moved away from conventional tillage of field surfaces prior to seeding to doing minimal or no tillage at all prior to seeding. In dry conditions these no-till operations have increased yields by preserving moisture to be used by growing crops, however in wet conditions significant problems arise.

When fields are wet at harvest time combines and grain moving wagons sink into the surface creating severe ruts. Wet harvests often also result in crops not being harvested at all before winter, such that in the spring the crop is ruined and lying on the field surface causing significant difficulties with the operation of equipment to seed the next crop.

Primary tillage using implements that penetrate relatively deeply into the soil surface is often used to address these problems. Tillage using heavy disc implements with highly concave discs set at an angle to the operating travel direction is often used to bury the crop lying on the field surface. Tillage using cultivators with shovels on the bottom of shanks, and commonly with harrows behind, can bury and spread the crop or crop residue lying on the field surface. Such primary tillage also smooths ruts left in the field.

When fields are wet at seeding time secondary tillage using implements that penetrate relatively shallowly into the soil surface is often used to disturb the soil surface and expose the soil so same will dry. Such secondary tillage also smooths most ruts left in the field and spreads and buries crop residue to facilitate seeding operations.

"Vertical" tillage appears to have no accepted definition but is also becoming common. In vertical tillage implements flat or slightly concave discs are oriented parallel to the operating travel direction or at a slight angle thereto. The discs penetrate the ground to form a slot in the slot surface and break up crop residue and disturb the soil.

Typically the main tillage tools used in primary and secondary tillage implements include a variety of discs and a variety of shovels mounted on the bottom end of cultivator shanks.

The discs can be concave or flat and may include notches on the circumference thereof. The discs are oriented anywhere from aligned with the operating travel direction to an angle of 20 degrees or more from the operating travel direction. In some implements a plurality of discs are mounted on a common shaft to form a gang and the gangs are mounted side by side across the width of the implement. In other implements the discs are mounted individually to the frame with a trip system such that each disc can move up and down independently.

The shovels mounted on the bottom end of cultivator shanks vary in width from narrow spikes which may be only an inch wide to sweeps that are wide enough to turn over all the soil that the implement passes over. Many of these main tillage tools such as concave discs and shovels are configured such that once engaged in the soil surface they tend to at least somewhat draw themselves into the soil.

Discs and shovels generally leave the soil loose and ridged. To provide a desirable smooth and packed seed bed behind the discs or shovels, harrows or rolling baskets or both are often mounted to the implement frame rearward of the main tillage tools.

The John Deere™ 2310 Mulch Finisher made by Deere & Co. of Moline, Ill., USA includes a row of slightly concave discs in gangs mounted along a front of the implement, followed by an array of cultivator shanks, with harrows behind the shanks and rolling baskets available behind the harrows to smooth the soil surface. The shanks are mounted to the frame with spring trip assemblies with a 200 pound trip force. This implement is only useful for lighter secondary tillage since the 200 pound trip force is not sufficient to keep the shank mounted tools in the fully lowered and engaged position at deeper penetration depths required for primary tillage.

Great Plains Manufacturing of Salina, Kans., USA makes a very similar implement in their 8000 Series Disc-o-vator. The 8000 Series implement also includes a row of similar disc gangs followed by an array of cultivator shanks, with harrows behind the shanks and rolling baskets behind the harrows. Again the shanks are mounted to the frame with light spring trip assemblies and this implement is also only useful for lighter secondary tillage.

BRIEF SUMMARY

The present disclosure provides a method and apparatus for seed bed preparation that overcomes problems in the prior art.

In a first embodiment the present disclosure provides a method of preparing a seed bed on a field surface. The method comprises mounting an implement frame on wheels for travel over the field surface in an operating travel direction; mounting to the implement frame a plurality of discs spaced side by side in a disc row along a width of a front of the implement frame wherein rotational axes of the discs are oriented substantially horizontally and perpendicular to the operating travel direction such that the discs penetrate the field surface substantially vertically; mounting to the implement frame a plurality of shank assemblies spaced side by side in shank rows behind the disc row along the width of the implement frame, each shank assembly comprising a shank and a shovel mounted on a bottom end of each shank wherein the shank assemblies are pivotally mounted to the implement frame such that each shank is pivotable rearward and upward with respect to the implement frame from a lowered working shank position to a raised tripped shank position; mounting a hydraulic cylinder between each shank and the implement frame and directing hydraulic fluid into each hydraulic cylinder such that each hydraulic cylinder exerts a substantially constant selected trip bias force on the corresponding shank toward the working shank position; mounting to the implement frame a plurality of harrow sections spaced side by side along the width of the implement frame rearward of the shank assemblies; mounting to the implement frame a plurality of rolling basket sections spaced side by side along the width of the implement frame rearward of the harrow sections; configuring the implement frame such that a total weight on the wheels when the discs, shovels, harrow sections, and rolling basket sections are in a raised transport position above the field surface is greater than about 850 pounds per foot of width of the implement frame; and towing the implement frame to the field surface, moving the discs, shovels, harrow sections, and rolling basket sections downward to an operating position engaging the field surface and towing the implement frame along the field surface at a speed greater than about seven miles per hour.

In a second embodiment the present disclosure provides an implement apparatus for preparing a seed bed on a field surface. The apparatus comprises an implement frame mounted on wheels for travel over the field surface in an operating travel direction. A plurality of discs is mounted to the implement frame and spaced side by side in a disc row along a width of a front of the implement frame, and rotational axes of the discs are oriented substantially horizontally and perpendicular to the operating travel direction such that the discs penetrate the field surface substantially vertically. The discs are movable from a lowered operating position engaging the field surface to a raised transport position above the field surface. A plurality of shank assemblies is mounted to the implement frame and spaced side by side in shank rows behind the disc row along the width of the implement frame, each shank assembly comprising a shank and a shovel mounted on a bottom end of each shank. The shanks are movable from a lowered operating position where the shovels engage the field surface to a raised transport position above the field surface. The shank assemblies are pivotally mounted to the implement frame such that, when in the lowered operating position, each shank is pivotable rearward and upward with respect to the implement frame from a lowered working shank position to a raised tripped shank position, and a hydraulic cylinder is mounted between each shank and the implement frame with a hydraulic fluid control operative to direct pressurized hydraulic fluid into each hydraulic cylinder such that each hydraulic cylinder exerts a substantially constant selected trip bias force on the corresponding shank toward the working shank position. A plurality of harrow sections is mounted to the implement frame and spaced side by side along the width of the implement frame rearward of the shank assemblies, and the harrow sections are movable from a lowered operating position engaging the field surface to a raised transport position above the field surface. A plurality of rolling basket sections is mounted to the implement frame and spaced side by side along the width of the implement frame rearward of the harrow sections and the rolling basket sections are movable from a lowered operating position engaging the field surface to a raised transport position above the field surface. The implement frame is configured such that a total weight on the wheels when the discs, shovels, harrow sections, and rolling basket sections are in the raised transport position above the field surface is greater than about 850 pounds per foot of width of the implement frame.

The present disclosure provides an implement apparatus for preparing a seed bed on a field surface that has sufficient weight to push the discs vertically into the field surface to cut through residue and maintain the shovels operating at a depth of about three inches or more such that significant depth of soil is lifted. At the high operating speeds to be used this lifted soil is thrown at significant speed and distances to mix with and bury residue. Hydraulic cylinders are used to exert the required high trip bias forces on the shanks to maintain the shovels at the desired operating depth at the high operating speeds. When tripped the hydraulic cylinders maintain the high trip bias forces to ensure the shovel re-engages the soil at the desired depth, and the nature of a hydraulic circuit which somewhat restricts flow dampens the movement of the shank back from the tripped shank position to the to the working shank position such that objects are not thrown forward with hazardous force as is often encountered with the stronger spring type shank assemblies. Following harrows and rolling baskets spread residue and scatter and pack soil to leave a firm seed bed with little ridging.

The combination of weight and hydraulic shank trip bias force allow the apparatus to be operated at the high speeds that provide the best results, while avoiding propelling objects at hazardous high speeds when a shank resets from the tripped position. The wheel and shank configuration further maintains consistent depth of ground penetration by the shovels.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-6 illustrate an embodiment of an implement apparatus 1 of the present disclosure for preparing a seed bed on a field surface 3. To provide a generally satisfactory seed bed the field surface should be firm and free of ridges, and residue on the field surface should be buried or cut so that same will not plug between the furrow openers of seeding implements.

The apparatus comprises an implement frame 5 mounted on wheels 7 for travel over the field surface 3 in an operating travel direction T. A plurality of discs 9 is mounted to the implement frame 5 and spaced side by side in a disc row DR along a width W of a front of the implement frame 5. Rotational axes RA of the discs 9 are aligned in the illustrated apparatus 1 and oriented substantially horizontally and perpendicular to the operating travel direction T such that the discs 9 penetrate the field surface 3 substantially vertically. The discs 9 are movable from a lowered operating position engaging the field surface 3 as shown in FIG. 4 to a raised transport position above the field surface 3 shown in FIG. 3.

A plurality of shank assemblies 11 is mounted to the implement frame 5 and spaced side by side in shank rows SR behind the disc row DR along the width of the implement frame 5. Each shank assembly 11 comprises a shank 13 and a shovel 15 mounted on a bottom end of each shank 13. The shovels 15 may be narrow spikes with a width of an inch or two, to wide sweeps with a width of twelve to sixteen inches or more. The shanks 13 are movable from a lowered operating position where the shovels engage the field surface as shown in FIG. 4 to a raised transport position above the field surface 3 shown in FIG. 3.

Figure 11:
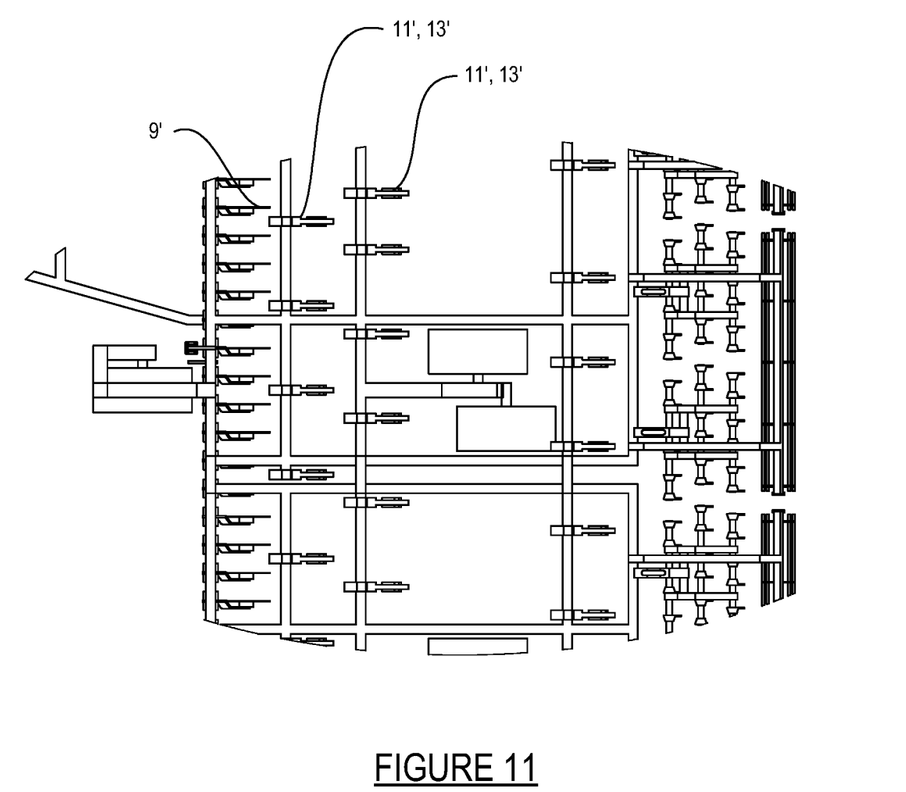
FIG. 11 is a schematic top view of the discs arranged such that each disc is aligned mid-way between adjacent shank assemblies.

In the illustrated apparatus 1 the discs 9 are arranged along disc row DR such that each disc 9 is directly aligned in front of a corresponding shank assembly 11 so that the disc 9 cuts a slot through any residue on the field surface 3 and the shank 13 can pass along the slot without dragging residue. In some field situations it may instead be desired to arrange the discs 9', as schematically illustrated in FIG. 11, such that each disc 9' cuts a slot midway between two following shank assemblies 11' such that each shank 13' will drag and spread the cut lengths of residue.

Figure 7:
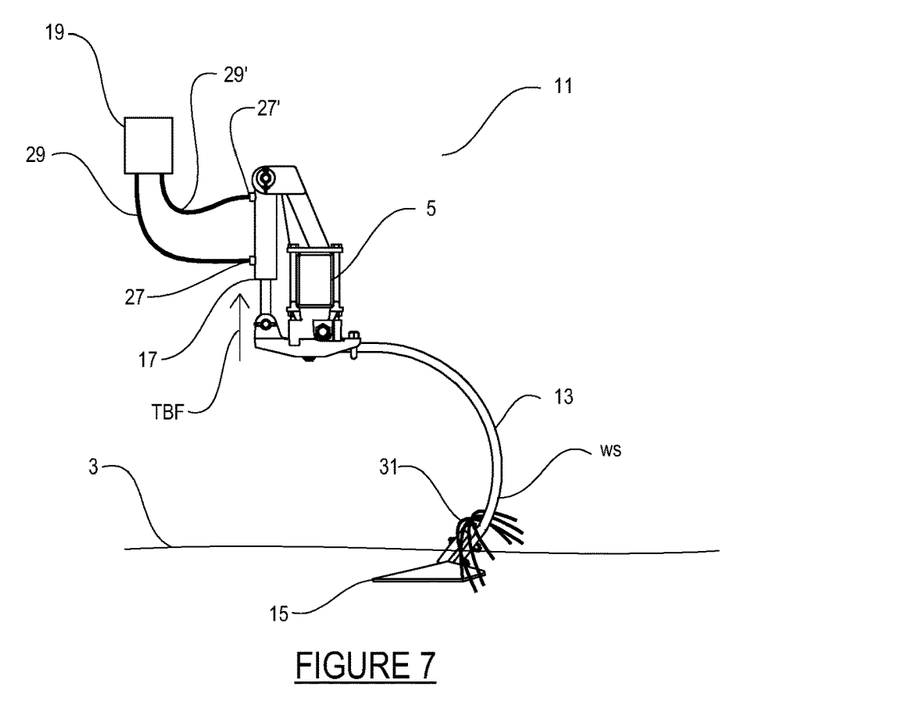
FIG. 7 is a side view of a shank assembly mounted on the implement frame with the shank in the working shank position.
Figure 8:
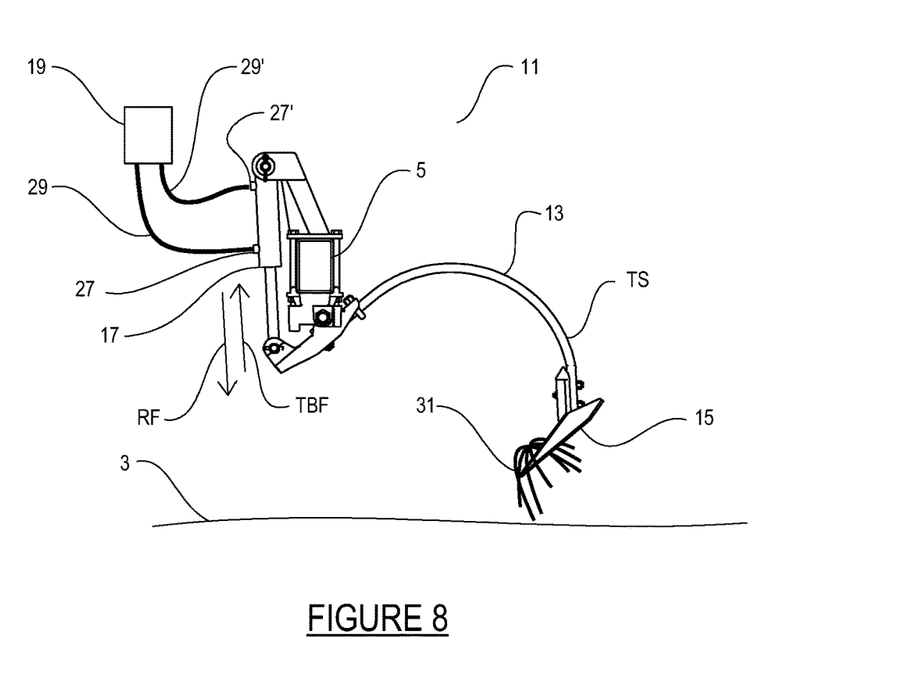
FIG. 8 is a side view of a shank assembly mounted on the implement frame with the shank in the tripped shank position.

The shank assemblies 11 are pivotally mounted to the implement frame 5 such that, when in the lowered operating position, each shank 13 is pivotable rearward and upward with respect to the implement frame 5 from a lowered working shank position WS engaged in the field surface 3 shown in FIG. 7 to a raised tripped shank position TS above the field surface 3 as shown in FIG. 8.

As illustrated in FIGS. 7 and 8, a hydraulic cylinder 17 is mounted between each shank 13 and the implement frame 5 and a hydraulic fluid control 19 is operative to direct pressurized hydraulic fluid into each hydraulic cylinder 17 such that each hydraulic cylinder 17 exerts a substantially constant selected trip bias force TBF on the corresponding shank 13 toward the working shank position WS.

A plurality of harrow sections 21, typically tine harrows, is mounted to the implement frame 5 and spaced side by side along the width W of the implement frame 5 rearward of the shank assemblies 11. The harrow sections 21 are movable from a lowered operating position engaging the field surface as shown in FIG. 4 to a raised transport position above the field surface 3 shown in FIG. 3.

Finally a plurality of rolling basket sections 23 is mounted to the implement frame 5 and spaced side by side along the width W of the implement frame 5 rearward of the harrow sections 21. The rolling basket sections 23 are movable from a lowered operating position engaging the field surface 3 as shown in FIG. 4 to a raised transport position above the field surface 3 as seen in FIG. 3.

Figure 1:
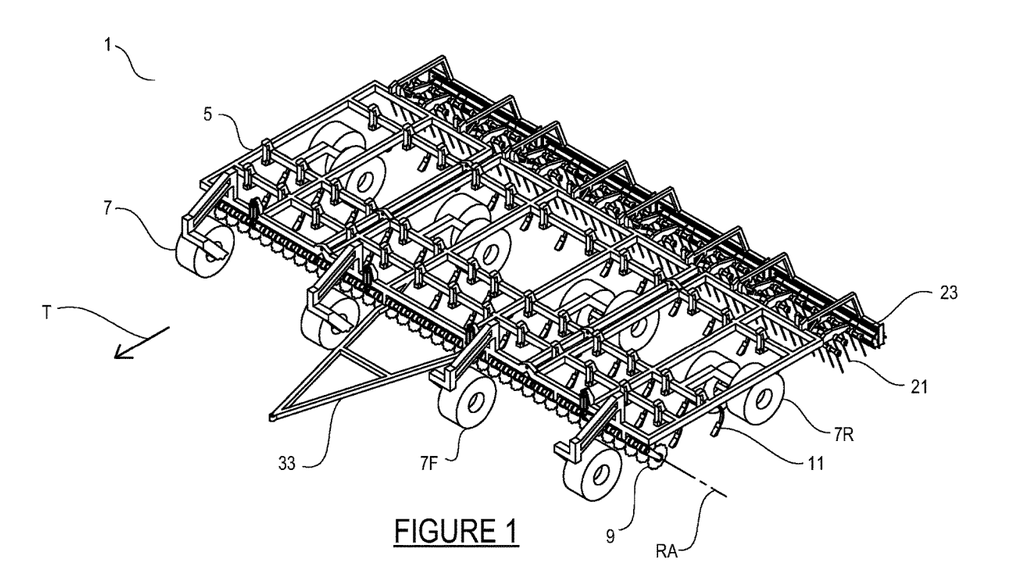
FIG. 1 is a schematic perspective view of an embodiment of the implement apparatus of the present disclosure for preparing a seed bed.
Figure 2:
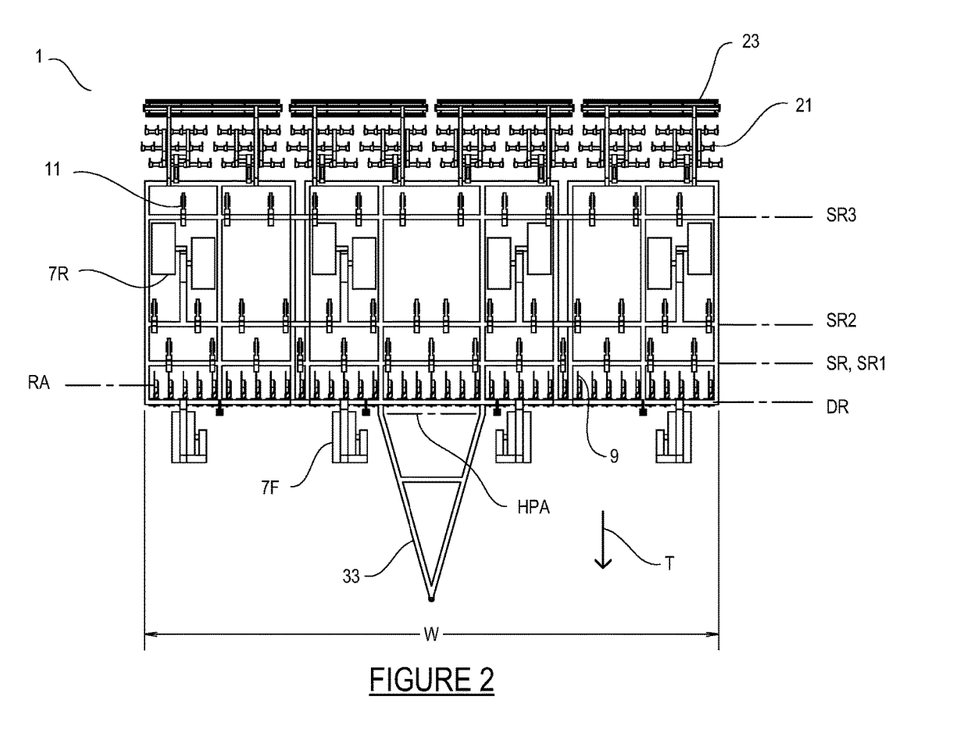
FIG. 2 is a top view of the embodiment of FIG. 1.
Figure 3:
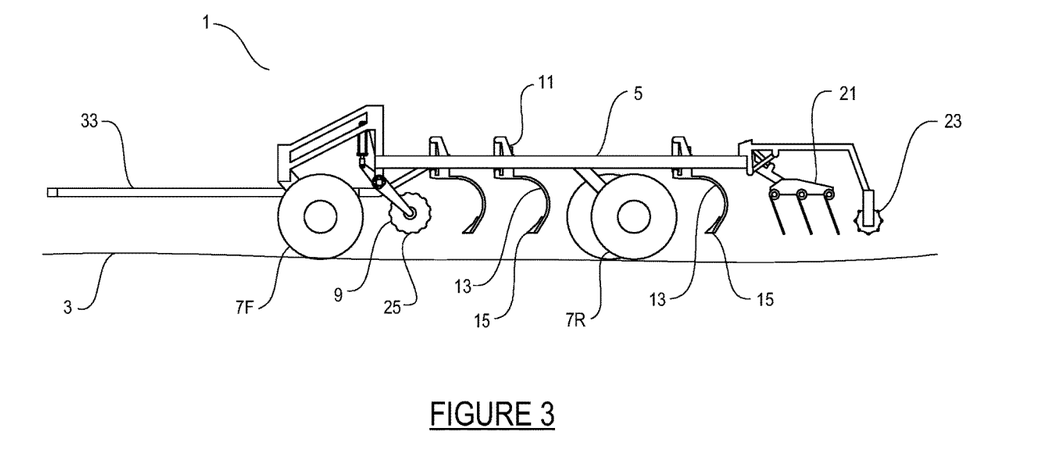
FIG. 3 is a side view of the embodiment of FIG. 1 with the discs, shovels, harrows, and rolling baskets in the raised transport position.
Figure 4:
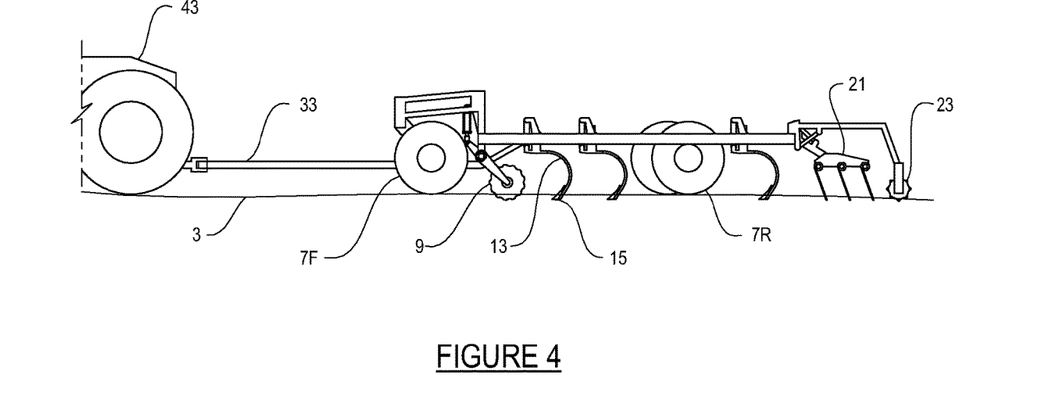
FIG. 4 is a side view of the embodiment of FIG. 1 with the discs, shovels, harrows, and rolling baskets in the lowered operating position.

The implement frame 5 is configured such that a total weight on the wheels 7 when, as shown in FIG. 3, the discs 9, shovels 15, harrow sections 21, and rolling basket sections 23 are in the raised transport position above the field surface 3 is at least 850 pounds per foot of width W of the implement frame 5, and typically more. For example the weight of a forty foot wide implement apparatus 1 will typically be 37,000 to 40,000 pounds.

In operation the discs 9, shovels 15, harrow sections 21, and rolling basket sections 23 are moved downward to the operating position engaging the field surface 3 as shown in FIG. 4 and the implement frame is towed along the field surface 3 at a speed greater than about seven miles per hour, and for best results up to about ten miles per hour.

The discs 9 are typically flat discs with no concavity and with notches 25 defined along the perimeter of the discs 9 to aid in penetrating the field surface 3 and cutting through the residue on top of the field surface 3. Such residue can be quite thick and the heavy weight of the apparatus 1 forces the discs 9 downward such that same cut through the residue and cut the residue into shorter lengths which can more readily pass between the furrow openers of a seeding implement in a following seeding operation.

The high weight also forces the shovels 15 downward so same penetrate the field surface to a depth of three inches or more to bring up soil which mixes with the shorter lengths of residue. The relatively high speed of operation at seven to ten miles per hour also causes the shovels 15 to lift and throw the soil such that a significant portion of the residue is buried. The buried residue decays faster and so breaks up when contacted by furrow openers during the following seeding operation and reduces the occurrence of plugging between the furrow openers.

The harrows 21 break up and spread soil lumps and residue and firm the field surface 3, while the rolling baskets 23 also break up soil lumps and pack the field surface 3. At the higher speed of operation of the apparatus 1 the rolling baskets 23 also act like a shallow rototiller, throwing and leveling the field surface 3 to provide the finished seed bed.

A key element of the apparatus 1 is the shank trip system illustrated in

FIGS. 7 and 8 using active hydraulic cylinders 17 which exert a constant trip bias force TBF on each shank 13 while the shanks 13 move between the working shank position WS and the tripped shank position TS. The hydraulic cylinders 17 need to exert a very high trip bias force TBF to keep the shanks 13 in the working shank position WS at the soil depths and operating speeds used. The trip bias force TBF is adjustable to a level sufficient to maintain each shank 13 in the working shank position WS when a rearward soil engagement force on the corresponding shovel 15 is up to about 1300 pounds. In the apparatus 1 the hydraulic fluid control 19 is operative to adjust the pressure of the hydraulic fluid in the hydraulic cylinders 17 to maintain the trip bias TBF force required to resist rearward soil engagement forces on the corresponding shovel 15 between zero and 1300 pounds.

A conventional spring biased shank mechanism can be configured to exert the required force of 1300 pounds toward the working shank position WS however when an obstacle such as a buried rock or the like is encountered at the higher operational speeds required for satisfactory operation, once the obstacle is cleared, the force of the spring pushing the shank 13 back to the working shank position WS is explosive. Dislodged rocks may be thrown forward with hazardous force, and the spring trip mechanism can be damaged as well.

Similarly a conventional spring operated shank trip system can be readily configured to exert the required trip force of 1300 pounds. Such spring trip systems however have a re-set force pushing the shank back to the working shank position WS once tripped that is typically much less than the tripping force. This re-set force will often not be sufficient to move the shank 13 to the working shank position WS as the apparatus moves along the field surface 3 at high speed and the operator will then need to raise the shanks 13 above the field surface to allow the shank 13 to move to the working shank position WS.

In the presently disclosed apparatus the hydraulic fluid control 19 maintains the hydraulic fluid in the hydraulic cylinders 17 at whatever pressure is required to provide the desired trip bias force TBF. When the shank 13 strikes an obstacle and moves rearward, hydraulic fluid is forced out of the hydraulic cylinder 17 through a port 27 in the barrel and then through a hydraulic conduit 29 back through the valves and the like in the hydraulic fluid control 19. Once the obstacle is cleared the hydraulic fluid must then flow back through the restrictions of the hydraulic conduit and port into the hydraulic cylinder 17. This somewhat restricted fluid movement dampens the movement of the shank 13 back to the working shank position WS such that the hazardous return to the working shank position WS with explosive force is not present.

A further significant advantage of shank trip system using active hydraulic cylinders 17 is the ability to operate the hydraulic fluid control 19 in a working mode as described above to maintain the shanks 13 in the working shank position WS, and to also operate the hydraulic fluid control 19 in a release mode to direct pressurized hydraulic fluid into each hydraulic cylinder 17 such that each hydraulic cylinder 17 exerts a release force on the corresponding shank 13 toward the tripped shank position of FIG. 8. Directing pressurized hydraulic fluid through conduit 29' into the port 27' of the hydraulic cylinder 17 instead of the port 27 will remove the trip bias force TBF and cause the hydraulic cylinder 17 to exert the release force RF in a direction opposite to the trip bias force TBF and move the shank 13 to the tripped shank position TS shown in FIG. 8.

Although the present apparatus 1 significantly reduces the occurrence of residue plugging between the shanks 13, plugging will occasionally occur and this feature is useful in clearing the shanks 13 of residue 31 as schematically illustrated in FIGS. 7 and 8. The residue 31 typically wraps around the shank 13 and drags. As the residue builds up the residue on one shank 13 can grow to meet the residue dragging on an adjacent shank 13, at which point plugging occurs as the path between the shanks is blocked. It can be seen that simply raising the shovels 15 vertically from the operating position of FIG. 4 to the transport position of FIG. 3 leaves the residue 31 hanging on the shank 13 and shovel 15, however tilting the shank 13 and shovel 15 back to the tripped shank position of FIG. 8 allows at least some of the residue 31 to slide down the shank 13 and off the shovel 15, facilitating clearing of the plug.

In the illustrated apparatus 1 a wheel control system comprising hydraulic cylinders is operative to move the wheels 7 vertically with respect to the implement frame 5 as is known in the art to raise and lower the implement frame 5. The wheel control system moves the wheels 7 upward with respect to the implement frame 5 to move the ground engaging tools, comprising the discs 9, shovels 15, harrow sections 21, and rolling basket sections 23, downward to the operating position of FIG. 4, and moves the wheels 7 downward with respect to the implement frame 5 to move the discs 9, shovels 15, harrow sections 21, and rolling basket sections 23 upward to the transport position shown in FIG. 3.

The illustrated apparatus 1 has a floating hitch 33 that is pivotally connected to the implement frame 5 about a hitch pivot axis HPA oriented horizontally and perpendicular to the operating travel direction T. The implement frame 5 is supported on castering front wheels 7F, located forward of the implement frame 5 and disc row DR, and rear wheels 7R. In order to accommodate all the required ground engaging tools the implement frame 5 must be quite long and so provides the most satisfactory operation when travelling straight or in a slow curve, since sharp turns will cause the ground engaging tools to move sideways, causing ridging.

Given that the apparatus 1 should be operated generally straight in the operating travel direction T in any event, some extra length added to the implement frame 5 is not particularly problematic. This extra length allows the shank assemblies 11 to be mounted to the implement frame 5 along a first shank row SR1 rearward of the disc row DR, a second shank row SR2 rearward of the first shank row SR1, and a third shank row SR3 rearward of the second shank row SR2, where a second shank row spacing SB between the second and third shank rows SR2, SR3 is greater than about two and one half times a first shank row spacing SA between the first and second shank rows SR1, SR2.

Figure 9:
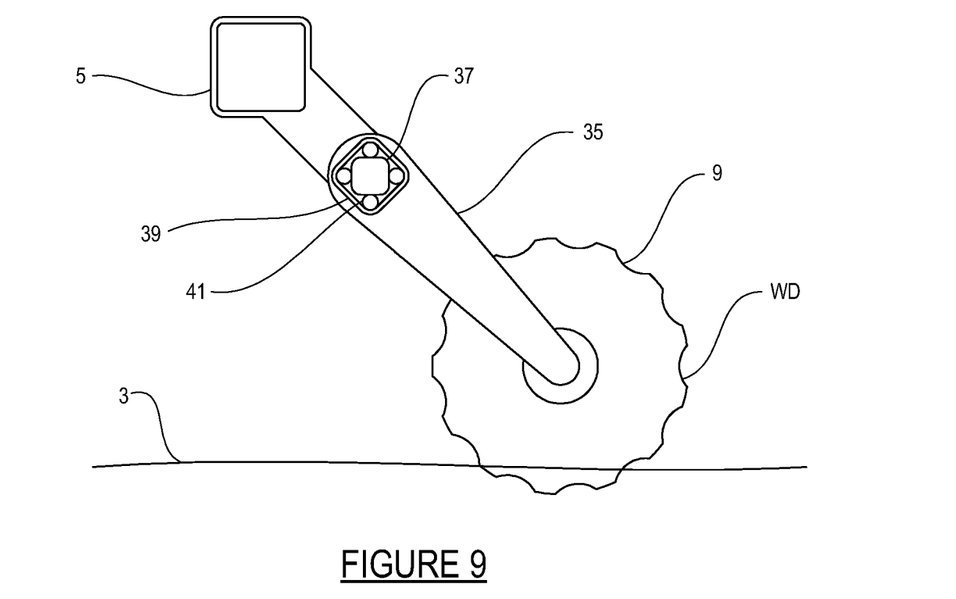
FIG. 9 is a side view of a disc mounted on the implement frame with the disc in the working disc position.
Figure 10:
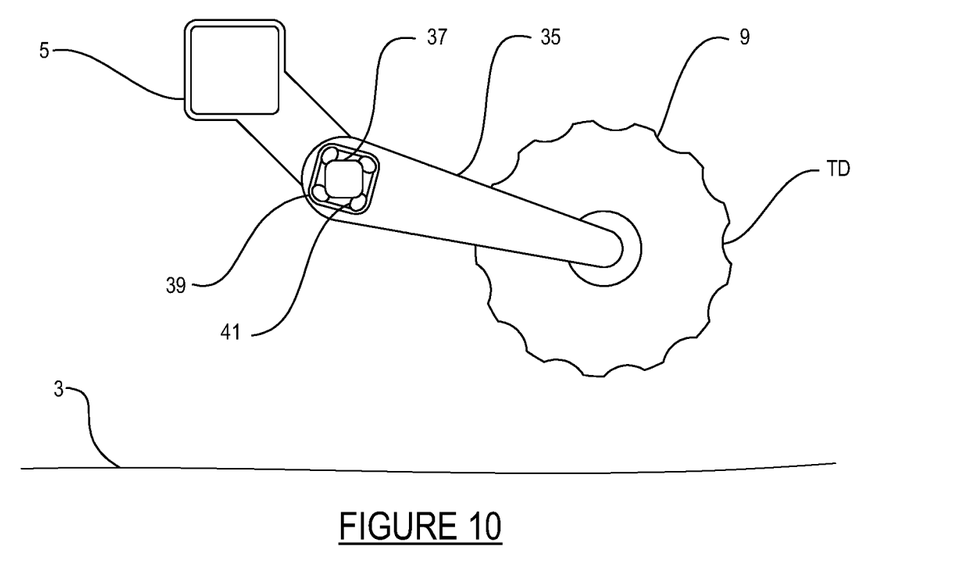
FIG. 10 is a side view of a disc mounted on the implement frame with the disc in the tripped disc position.

In the illustrated apparatus 1 the second shank row spacing SB is about two and one half times the first shank row spacing SA allowing ample space to mount the rear wheels 7R between the second and third shank rows SR2, SR3. The shovels 15 are the major ground working tools desired to work at the selected depth while the harrows 21 and rolling baskets 23 follow the field surface 3. Each disc 9 is pivotally mounted to the implement frame 5 such that each disc 9 is pivotable rearward and upward with respect to the implement frame 5 independent of adjacent discs 9 from a lowered working disc position WD shown in FIG. 9 to a raised tripped disc position TD as shown in FIG. 10. In the illustrated apparatus 1 each disc 9 is mounted to an arm 35 mounted in turn to the inner square tube 37 of a rubber torsion coupling. The inner square tube 37 is inside an outer square tube 39 with hard rubber inserts 41 in the corners of the outer square tube 39 which maintain the inner square tube 37 in the illustrated orientation with attached disc 9 in the working disc position WD, and resist movement away from the illustrated orientation. When an obstruction or hard soil is encountered the disc 9 can move upward and rearward away from the working disc position WD toward the tripped disc position TD and when the obstruction is cleared the hard rubber inserts will regain their shape and move the disc 9 back to the working disc position WD.

The distance of the implement frame 5 above the field surface 3 is substantially constant in rolling terrain at either of the wheels 7F, 7R however the distance of the implement frame 5 above the field surface 3 varies increasingly at frame locations moving farther from the wheels 7. Thus it is desirable to mount the shovels 15 as close to the wheels 7 as possible.

With rear wheels 7R located just in front of the rearmost third shank row SR3 and just behind the middle second shank row SR2 which itself is fairly close to the front first shank row SR1 the consistency of ground penetration depth of the shovels 15 is optimized in rolling terrain where the front and rear wheels 7F, 7R move up and down with respect to each other.

Figure 5:
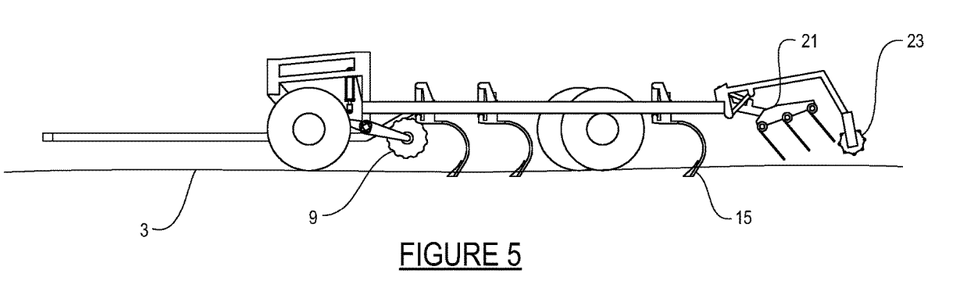
FIG. 5 is a side view of the embodiment of FIG. 1 with the shovels in the lowered operating position and the discs, harrows, and rolling baskets in a raised idle position.
Figure 6:
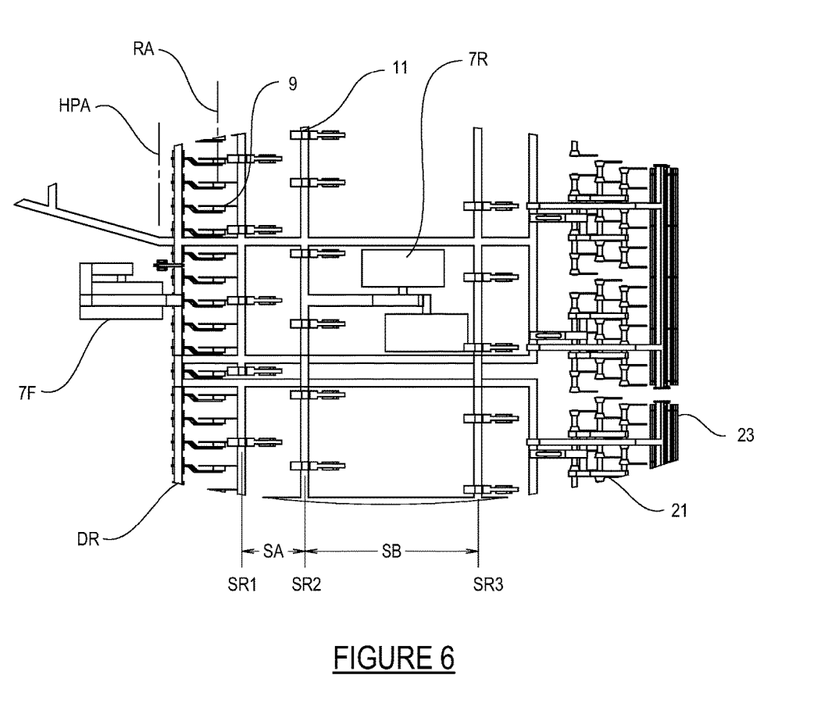
FIG. 6 is a top view of a section of the embodiment of FIG. 1.

In the illustrated apparatus 1 each of the discs 9, the harrow sections 21, and the rolling basket sections 23 can be secured in a raised idle position, independent of each other, when the shovels 15 are in the operating position engaged in the field surface 3 as shown in FIG. 5.

The present disclosure further provides a method of preparing a seed bed on a field surface 3 comprising mounting an implement frame 5 on wheels 7 for travel over the field surface 3 in an operating travel direction T; mounting to the implement frame 5 a plurality of discs 9 spaced side by side in a disc row DR along a width W of a front of the implement frame 5 wherein rotational axes RA of the discs 9 are oriented substantially horizontally and perpendicular to the operating travel direction T such that the discs 9 penetrate the field surface 3 substantially vertically; mounting to the implement frame 5 a plurality of shank assemblies 11 spaced side by side in shank rows SR behind the disc row DR along the width W of the implement frame 5, each shank assembly 11 comprising a shank 13 and a shovel 15 mounted on a bottom end of each shank 13 wherein the shank assemblies 11 are pivotally mounted to the implement frame 5 such that each shank 13 is pivotable rearward and upward with respect to the implement frame 5 from a lowered working shank position WS to a raised tripped shank position TS; mounting a hydraulic cylinder 17 between each shank 13 and the implement frame 5 and directing hydraulic fluid into each hydraulic cylinder 17 such that each hydraulic cylinder 17 exerts a substantially constant selected trip bias force TBF on the corresponding shank 13 toward the working shank position WS; mounting to the implement frame 5 a plurality of harrow sections 21 spaced side by side along the width W of the implement frame 5 rearward of the shank assemblies 11; mounting to the implement frame 5 a plurality of rolling basket sections 23 spaced side by side along the width W of the implement frame 5 rearward of the harrow sections 21; configuring the implement frame 5 such that a total weight on the wheels 7 when the discs 9, shovels 15, harrow sections 21, and rolling basket sections 23 are in a raised transport position above the field surface 3 is greater than about 850 pounds per foot of width of the implement frame 5; and towing the implement frame 5 to the field surface 3, moving the discs 9, shovels 15, harrow sections 21, and rolling basket sections 23 downward to an operating position engaging the field surface 3 and towing the implement frame 5 along the field surface 3 at a speed greater than about seven miles per hour.

Towing the implement frame at speeds of seven to ten miles per hour at a suitable shovel ground penetration depth of at least three inches up to four or five inches will typically require a tractor 43, as schematically illustrated in FIG. 4 connected to the hitch 33, with an engine horsepower rating of about 12 horsepower foot of implement frame width W. Thus a 40 foot wide implement frame 5 will require a tractor with greater than about 450 horsepower and a 50 foot wide implement frame 5 will require a tractor with greater than about 600 horsepower.

The present disclosure provides an implement apparatus 1 for preparing a seed bed on a field surface 3 that has sufficient weight to push the discs 9 vertically into the field surface 3 to cut through residue and facilitate passage of the shanks by reducing plugging with residue. The relatively high weight also maintains the shovels 15 operating at a depth of about three inches or more such that significant depth of soil is lifted and at the high operating speeds to be used this lifted soil is thrown at significant speed and distances to mix with and bury residue. Hydraulic cylinders 17 exert high trip bias forces TBF on the shanks to maintain the shovels 15 at the desired operating depth, and when tripped maintain the high trip bias forces to ensure the shovel 15 re-engages the soil at the desired depth. The restricted flow of hydraulic fluid dampens the movement of the shank 13 back from the tripped shank position TS to the to the working shank position WS such that rocks and soil are not thrown forward with hazardous force. Following harrows 21 and rolling baskets 23 spread residue and pack and scatter soil to leave a firm seed bed with little ridging.

The combination of weight and hydraulic shank trip bias force allow the apparatus to be operated at the high speeds that provide the best results, while avoiding propelling objects such as rocks at hazardous high speeds. The wheel and shank configuration further maintains consistent depth of ground penetration by the shovels 15.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of preparing a seed bed on a field surface comprising:
    mounting an implement frame on wheels for travel over the field surface in an operating travel direction;
    mounting to the implement frame a plurality of discs spaced side by side in a disc row along a width of a front of the implement frame wherein rotational axes of the discs are oriented substantially horizontally and perpendicular to the operating travel direction such that the discs penetrate the field surface substantially vertically;
    mounting to the implement frame a plurality of shank assemblies spaced side by side in shank rows behind the disc row along the width of the implement frame, each shank assembly comprising a shank and a shovel mounted on a bottom end of each shank;
    wherein the shank assemblies are pivotally mounted to the implement frame such that each shank is pivotable rearward and upward with respect to the implement frame from a lowered working shank position to a raised tripped shank position;
    mounting a hydraulic cylinder between each shank and the implement frame and directing hydraulic fluid into each hydraulic cylinder such that each hydraulic cylinder exerts a substantially constant selected trip bias force on the corresponding shank toward the working shank position;
    mounting to the implement frame a plurality of harrow sections spaced side by side along the width of the implement frame rearward of the shank assemblies;
    mounting to the implement frame a plurality of rolling basket sections spaced side by side along the width of the implement frame rearward of the harrow sections;
    configuring the implement frame such that a total weight on the wheels when the discs, shovels, harrow sections, and rolling basket sections are in a raised transport position above the field surface is greater than 850 pounds per foot of width of the implement frame; and
    towing the implement frame to the field surface, moving the discs, shovels, harrow sections, and rolling basket sections downward to an operating position engaging the field surface and towing the implement frame along the field surface at a speed greater than seven miles per hour.

2. The method of claim 1 comprising adjusting the trip bias force to a level sufficient to maintain each shank in the working shank position when a rearward soil engagement force on the corresponding shovel is up to about 1300 pounds.

3. The method of claim 2 comprising moving the discs, shovels, harrow sections, and rolling basket sections downward to the operating position by moving the wheels upward with respect to the implement frame, and moving the discs, shovels, harrow sections, and rolling basket sections upward to the transport position by moving the wheels downward with respect to the implement frame.

4. The method of claim 3 comprising a first shank row rearward of the disc row, a second shank row rearward of the first shank row, and a third shank row rearward of the second shank row, and comprising optimizing a consistency of a ground penetration depth of the shovels by mounting the implement frame on front wheels located forward of the disc row and rear wheels located between the second and third shank rows.

5. The method of claim 4 wherein a second shank row spacing between the second and third shank rows is greater than about two and one half times a first shank row spacing between the first and second shank rows.

6. The method of claim 1 comprising directing hydraulic fluid into each hydraulic cylinder such that each hydraulic cylinder exerts a release force on the corresponding shank toward the tripped shank position.

7. The method of claim 1 wherein each disc is pivotally mounted to the implement frame such that each disc is pivotable rearward and upward with respect to the implement frame independent of adjacent discs from a lowered working disc position to a raised tripped disc position.

8. The method of claim 7 wherein the discs are arranged such that each disc is either directly aligned in front of a corresponding shank assembly or midway between adjacent shank assemblies.

9. The method of claim 8 comprising defining notches along a perimeter of the discs.

10. The method of claim 1 comprising moving the shovels to engage the field surface to a depth of at least three inches when in the operating position.

11. The method of claim 1 comprising securing at least one of the discs, the harrow sections, and the rolling basket sections in a raised idle position when the shovels are in the operating position.

* * * * *